United States Patent
Zhou et al.

(10) Patent No.: US 10,287,520 B2
(45) Date of Patent: May 14, 2019

(54) GASIFICATION QUENCH SYSTEM

(71) Applicant: General Electric Company, Schenectady, NY (US)

(72) Inventors: Qiong Zhou, Houston, TX (US); Yichuan Fang, Houston, TX (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 15/429,077

(22) Filed: Feb. 9, 2017

(65) Prior Publication Data
US 2018/0223200 A1    Aug. 9, 2018

(51) Int. Cl.
| | | |
|---|---|---|
| *C10J 3/84* | (2006.01) | |
| *B01D 45/08* | (2006.01) | |
| *B01D 47/02* | (2006.01) | |
| *B01D 50/00* | (2006.01) | |

(52) U.S. Cl.
CPC .............. *C10J 3/845* (2013.01); *B01D 45/08* (2013.01); *B01D 47/021* (2013.01); *B01D 50/004* (2013.01); *C10J 2300/0976* (2013.01); *C10J 2300/1603* (2013.01); *C10J 2300/1643* (2013.01); *C10J 2300/1884* (2013.01)

(58) Field of Classification Search
CPC .......... C10J 3/84; B01D 45/08; B01D 47/021; B01D 50/004; F28C 3/06
See application file for complete search history.

(56) References Cited

U.S. PATENT DOCUMENTS

| | | | | |
|---|---|---|---|---|
| 2,818,326 A | * | 12/1957 | Eastman | C01B 3/32 261/121.1 |
| 4,494,963 A | * | 1/1985 | Reich | C10J 3/485 48/69 |
| 4,581,899 A | * | 4/1986 | von Klock | C10J 3/485 261/112.1 |
| 4,778,483 A | * | 10/1988 | Martin | B01D 47/024 48/69 |
| 4,828,578 A | * | 5/1989 | Den Bleyker | B01J 19/0013 48/69 |
| 6,238,468 B1 | * | 5/2001 | Nilsson | D21C 11/04 95/226 |
| 8,673,036 B2 | * | 3/2014 | Tiwari | C10J 3/84 261/110 |
| 2010/0140817 A1 | * | 6/2010 | Harteveld | C10J 3/485 261/112.1 |

(Continued)

*Primary Examiner* — Matthew J Merkling
(74) *Attorney, Agent, or Firm* — Fletcher Yoder, P.C.

(57) ABSTRACT

A system including a quench system that may cool a syngas generated in a gasification chamber. The quench system includes a quench chamber, a dip tube that may direct the syngas from the gasification chamber into a quench liquid in the quench chamber to cool the syngas and to generate a first cooled syngas, and a draft tube disposed circumferentially about the dip tube and configured to receive the first cooled syngas in a first direction along a first passage. The first passage is disposed between a first wall of the dip tube and a second wall of the draft tube. The quench system also includes a droplet tube that may receive the first cooled syngas from the first passage. The droplet tube includes a third wall that may redirect a flow of the first cooled syngas in a second direction different from the first direction.

20 Claims, 4 Drawing Sheets

(56) References Cited

U.S. PATENT DOCUMENTS

2010/0325956 A1\* 12/2010 Dinu .................. C10J 3/485
  48/85
2011/0067304 A1\* 3/2011 Klockow ............ B01D 47/021
  48/87

\* cited by examiner

GASIFICATION QUENCH SYSTEM

BACKGROUND

The subject matter disclosed herein relates to gasification systems and, more particularly, to quench system configurations for separating entrained quench liquid from syngas.

Fossil fuels, such as solid coal, liquid petroleum, or biomass, may be gasified for use in the production of electricity, chemicals, synthetic fuels, or for a variety of other applications. Gasification involves reacting a carbonaceous fuel and oxygen at a very high temperature to produce synthesis gas, commonly referred to as syngas, which is a fuel containing carbon monoxide and hydrogen. Syngas combusts more efficiently and cleaner than the fuel in its original state before gasification. In addition to the syngas, gasification may also generate several by-products such as carbon dioxide, hydrogen sulfide, ammonia, slag, fine particles of ash, and unconverted carbon. Accordingly, prior to use, the syngas may be cooled and further processed to separate the by-products from the syngas.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system including a quench system that may cool a syngas generated in a gasification chamber. The quench system includes a quench chamber, a dip tube that may direct the syngas from the gasification chamber into a quench liquid in the quench chamber to cool the syngas and to generate a first cooled syngas, and a draft tube disposed circumferentially about the dip tube and configured to receive the first cooled syngas in a first direction along a first passage. The first passage is disposed between a first wall of the dip tube and a second wall of the draft tube. The quench system also includes a droplet tube that may receive the first cooled syngas from the first passage. The droplet tube includes a third wall that may redirect a flow of the first cooled syngas in a second direction different from the first direction.

In a second embodiment, a system includes a draft tube that may mount about a dip tube in a quench system of a gasifier downstream from a gasification chamber. The draft tube may receive a first cooled syngas flow from a quench liquid in a first direction. The system also includes a droplet tube including a wall that may redirect a flow of the first cooled syngas in a second direction different from the first direction.

In a third embodiment, a method includes routing a syngas from a gasification chamber, through a dip tube, and into a quench liquid to cool the syngas to generate a cooled syngas, routing the cooled syngas in a first flow direction through a passage between the dip tube and a draft tube disposed circumferentially about the dip tube, and directing a flow of the cooled syngas into an annular space circumferentially about the dip tube and the draft tube in a second direction that is different from the first direction using a droplet tube positioned adjacent to a first outlet of the draft tube. The droplet tube includes a first wall having a first wall portion radially extending away from the dip tube and a second wall portion extending axially away from the first wall portion such that a second outlet of the droplet tube is below the first outlet of the draft tube. The annular space is disposed between the first wall of the droplet tube and a second wall of the draft tube.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a gasification system including a quench chamber designed to remove entrained liquid or moisture (e.g., quench liquid such as water) from a syngas generated in a gasification system. Generally, during gasification, a fuel source or feedstock undergoes partial oxidation in a gasifier to produce a syngas. The resultant syngas exits the gasifier and enters the quench chamber at a high temperature and a high pressure. Accordingly, the syngas may be cooled to a desired temperature. Cooling of the syngas may also facilitate removal of gasification by-products that may be mixed with the syngas exiting the gasifier. The quench chamber may use a quench liquid (e.g., water) to cool the syngas, which may increase a moisture content of the syngas due to water vapor from evaporation of the quench liquid and entrainment of the quench liquid. For example, hot syngas from the gasifier is directed toward a quench pool located downstream of the gasifier and having the quench liquid, which cools the syngas. The hot syngas contacts the quench liquid, thereby wetting and scrubbing the hot syngas and associated by-products of gasification (e.g., slag). As the hot syngas contacts the quench liquid, a portion of the quench liquid may evaporate due, in part, to the temperature of the hot syngas to form water vapor that may enter the cooled syngas. Additionally, the quench chamber may include a draft tube configured such that drag forces acting on the quench liquid by the syngas as a result of a flow velocity of the syngas entrain sufficient quench liquid in the syngas producing a three-phase gas-vapor-liquid flow. Therefore, the quench chamber may include certain features that may facilitate removal of the entrained quench liquid from the cooled syngas before the syngas is directed to downstream processes (e.g., a syngas treatment, power production, etc.). In certain embodiments, the quench chamber may include features to mitigate formation of liquid droplets of the quench liquid that may become entrained in the cooled syngas exiting the draft tube, and redirect a flow of the cool syngas through the quench chamber. For example, the quench chamber may include a capped droplet tube (e.g., an annular baffle) that mitigates shearing (e.g., shedding) of the entrained quench liquid such that a less amount of small droplets (e.g., between approximately 100 and 500 microns (μm)) are formed, and changes a flow direction of the cooled syngas exiting the draft tube from a first direction to a second direction. By redirecting the flow of the cooled syngas exiting the draft tube, the momentum of the entrained quench liquid may be decreased. As such, at least a portion of the entrained quench liquid may be separated from the cooled syngas. Additionally, the capped droplet tube may be positioned at or adjacent to an outlet of the draft tube, which may mitigate formation of droplet of quench liquid that may become entrained by the cooled syngas exiting the draft tube.

Moreover, the capped droplet tube may create multiple annular spaces that may increase a residence time of the cooled syngas in the quench chamber and may facilitate removal of the entrained quench liquid from the cooled syngas. While in the annular spaces, a flow velocity of the cooled syngas may be decreased as the cooled syngas expands to fill the annular spaces. The decrease in the flow velocity of the cooled syngas may decrease the drag forces acting on the entrained quench liquid by the cooled syngas. The decrease in the drag forces acting on the entrained quench liquid by the cooled syngas may allow the entrained quench liquid to separate from the cooled syngas, thereby generating a syngas having a low liquid water content, such as between approximately 75% and 99% less entrained quench liquid compared to the cooled syngas flowing through the draft tube.

The multiple annular spaces created by positioning the capped droplet tube at the outlet of the draft tube may increase a length of the flow path of the cooled syngas passing from the draft tube into the multiple annular spaces of the quench chamber downstream of the draft tube, and therefore, increase the residence time of the cooled syngas within the quench chamber. For example, the flow path of the cooled syngas may be more tortuous compared to a quench chamber that does not include the disclosed capped droplet tube. The tortuous flow path of the cooled syngas through the quench chamber may increase the residence time of the cooled syngas, thereby allowing the cooled syngas to remain in the quench chamber for a desirable amount of time to facilitate removal of the entrained quench liquid from the cooled syngas.

The quench chamber includes a dip tube upstream of the draft tube that directs the hot syngas toward a pool of the quench liquid used to cool the syngas. As the hot syngas impinges on the pool of the quench liquid, the flow velocity of the syngas applies drag forces on at least a portion of the quench liquid, causing entrainment of the quench liquid with the syngas (e.g., a three-phase vapor-gas-liquid flow) and generating a partially cooled syngas. Therefore, after flowing through the dip tube, the hot syngas impinges on the quench liquid before flowing into the draft tube. The draft tube is positioned circumferentially around the dip tube such that the partially cooled syngas (e.g., the three-phase vapor-gas-liquid mixture) flows into the draft tube in a flow direction (e.g., upward direction) that is substantially opposite a flow direction (e.g., downward direction) of the syngas flowing through the dip tube. For example, the partially cooled syngas flows into the draft tube in an upward direction and toward a syngas outlet. The upward flow may enable the syngas to draw copious quantities of quench liquid as it flows into the annulus between the draft tube and the dip tube, thereby increasing the contact time between the syngas and the quench liquid, and consequently the effectiveness of the quenching operation.

The draft tube may improve the effectiveness of the contact between the syngas and the quench liquid. However, the contact between the syngas and the quench liquid may result in high levels of entrained quench liquid in the syngas exiting the annular space between the dip tube and the draft tube. The entrained quench liquid may be difficult to separate from the syngas before it reaches an outlet of the quench chamber (e.g., a quench exit nozzle). Accordingly, it may be difficult to maintain a desirable amount of the quench liquid in the quench chamber that may be required for the quenching process and/or any other downstream processes. However, redirecting the flow (e.g., from an upward direction to a downward direction) of the partially cooled syngas exiting the outlet of draft tube may mitigate formation of droplets of the quench liquid that may become entrained in the partially cooled syngas as the partially cooled syngas exits the draft tube. Additionally, a flow velocity of the partially cooled syngas may decrease as the partially cooled syngas fills an annular space between the baffle and the draft tube, which may also decrease the drag forces acting on the entrained quench liquid due to the upward flow direction of the partially cooled syngas and the momentum of the entrained quench liquid. The decreased flow velocity of the partially cooled syngas may also facilitate removal of the entrained quench liquid by increasing an amount of time the partially cooled syngas is within the quench chamber before exiting through the syngas outlet. Without the disclosed embodiments, droplet formation and droplet size of the quench liquid and a flow velocity and residence time of the partially cooled syngas through the quench chamber may be such that the entrained quench liquid may not be adequately removed from the partially cooled syngas before a cooled syngas exits the syngas outlet. Therefore, it may be desirable to include the capped droplet tube (e.g., annular baffle) at an exit of the draft tube that may redirect the flow of the partially cooled syngas through the quench chamber to mitigate formation of droplets of the quench liquid and decrease a flow velocity of the partially cooled syngas, which may facilitate removal of the entrained quench liquid from the partially cooled syngas and allow effective cooling of the partially cooled syngas to generate the cooled syngas. For example, the capped droplet tube may serve as shear plate to remove a substantial portion of the entrained quench liquid from the partially cooled syngas. Accordingly, provided herein is a quench chamber that includes a capped droplet tube at the outlet of the draft tube that decreases formation of droplets of the quench liquid, redirects a flow of the partially cooled syngas, and decreases a flow velocity to allow efficient removal of the quench liquid entrained in the cooled syngas.

Figure 1:
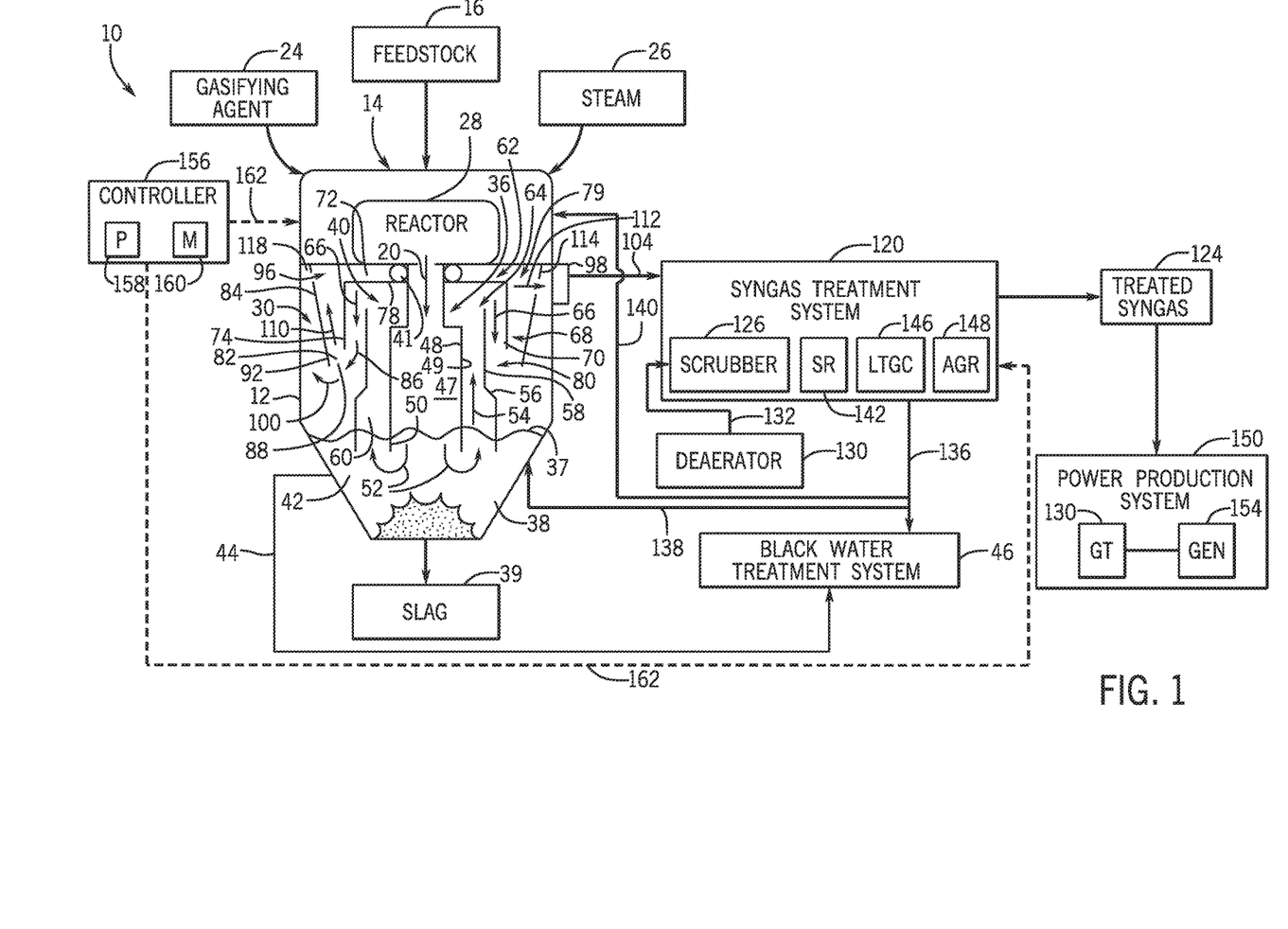
FIG. 1 is a block diagram of an embodiment of a gasification system including a gasification vessel having a draft tube and a droplet tube positioned in a quench chamber, whereby the droplet tube circumferentially surrounds at least a portion of draft tube and includes a cap that redirects a flow of cooled syngas exiting the draft tube.

FIG. 1 is a schematic diagram of an embodiment of a gasification system 10 configured to separate a cooling fluid (e.g., quench liquid) from syngas generated in the gasification system 10. As shown in FIG. 1, the gasification system 10 may include a gasification vessel 12 having a gasifier 14 (e.g., reactor) configured to gasify a feedstock 16 (e.g., fuel) to generate an untreated syngas 20. The feedstock 16 may include coal, petroleum coke, coal and coke blends, biomass, wood-based materials, agricultural wastes, tars, asphalt, gas oil, coke oven gas, fuel gas, natural gas, or other carbon containing materials. The feedstock 16 may be resized or reshaped, for example, by chopping, milling, shredding, pulverizing, briquetting, or pelletizing the feedstock 16 prior to entering the gasifier 14. Additionally, the feedstock 16 may include additives, such as water, to create a feedstock slurry. However, in other embodiments, the feedstock 16 may enter the gasifier 14 as a dry feedstock. The gasifier 14 may be part of an integrated gasification combined cycle (IGCC) power plant or any other variety of plants that use or produce a syngas. The gasifier 14 may be an updraft or downdraft fixed-bed gasifier, a fluidized-bed gasifier, such as a bubbling fluidized-bed gasifier or a circulating fluidized-bed gasifier, a moving bed gasifier, or an entrained flow gasifier.

While in the gasifier 14, the feedstock 16 may be mixed with a gasifying agent 24 (e.g., oxidant, such as, oxygen, oxygen-rich air, or oxygen-reduced air) and steam 26 in a reactor 28 (e.g., reaction chamber or gasification chamber) disposed within the gasifier 14 to produce the untreated syngas 20. In particular, the feedstock 16 may be reacted with a limited amount of the gasifying agent 24 at elevated pressures (e.g., from absolute pressures of approximately 20 bar to 85 bar) and temperatures (e.g., approximately 700° C. to 1600° C.) to partially oxidize the feedstock 16 and generate the untreated syngas 20. Due to chemical reactions between the gasifying agent 24, steam 26, and carbon within the feedstock 16, the untreated syngas 20 may include hydrogen, carbon monoxide, water, ammonia, hydrogen sulfide, methane, and carbon dioxide, as well as other components, such as ash, sulfur, nitrogen, and chloride, present in the carbonaceous fuel. In addition, the untreated syngas 20 may include unconverted carbon (e.g., feedstock that did not participate in gasification reactions).

The gasifier 14 may also include a quench chamber 30 downstream of the reactor 28. In certain embodiments, the quench chamber 30 may be integral with the gasifier 14. In other embodiments, the quench chamber 30 may be a separate unit from the gasifier 14. The quench chamber 30 may cool and separate the untreated syngas 20 from gasification by-products (e.g., molten slag.). Within the reactor 28, the feedstock 16 may be heated to undergo various conversion processes including pyrolysis and partial oxidation. According to certain embodiments, depending on the feedstock 16 utilized, pyrolysis may occur at temperatures inside the reactor 28 ranging from approximately 150° C. to 700° C., and partial oxidation may occur at temperatures ranging from approximately 1100° C. to approximately 1600° C. These processes may generate a solid, e.g., char, and residue, a liquid, e.g., molten slag, and gases, e.g., carbon monoxide, water, methane, and hydrogen. The quench chamber 30 of the gasifier 14 may receive the untreated syngas 20 and the gasification by-products, as indicated by arrow 20, as they leave the reactor 28 through a bottom end 36 (or throat) of the reactor 28. In general, the quench chamber 30 may be used to quench and thereby reduce the temperature of the untreated syngas 20 and gasification by-products, and to disengage a portion of the gasification by-products (e.g., molten slag) from the untreated syngas 20. In certain embodiments, a quench liquid 38 (e.g., water) may flow from adjacent the bottom end 36 and fill the quench chamber 30 to facilitate cooling of the untreated syngas 20 and gasification by-products (e.g., molten slag). For example, as the untreated syngas 20 and gasification by-products flow through the bottom end 36 (e.g., arrow 20), at least a portion of the quench liquid 38 within the quench chamber 30 may vaporize by extracting heat from the untreated syngas 20 and molten slag, resulting in cooling of the untreated syngas 20 and the cooling and solidifying of molten slag to form solid slag 39. In certain embodiments, the quench chamber 30 may include a quench ring 41 at the bottom end 36 (e.g., at an entrance 40 of the quench chamber 30) configured to provide the quench liquid 38 to the quench chamber 30. The slag 39 may accumulate in a bottom of a quench bath 42, after which the slag 39 may be removed and directed to downstream processing systems configured to dispose of the slag 39 and recover a substantial portion (e.g., between approximately 90% and approximately 99%) of the liquid from the slag 39. Similarly, fine ash and unconverted carbon separated from syngas 20 may be withdrawn from quench chamber 30 as a black water stream 44 and be sent to a black water treatment system 46 for further handling.

The quench system 30 also includes a dip tube 48 (e.g., annular dip tube) extending from the bottom end 36 of the reactor 28 toward the bottom of the quench bath 42 of the quench chamber 30 that conducts the hot untreated syngas 20 and gasification byproducts into the quench liquid 38. The dip tube 48 may take any form suitable for facilitating cooling of the untreated syngas 20 and/or for directing the untreated syngas 20 toward the quench bath 42. For example, the dip tube 48 (e.g., annular dip tube) may have a wall 49 (e.g., annular wall) extending circumferentially about an interior chamber or passage 47. In certain embodiments, a lower end 50 of the dip tube 48 may extend into the quench liquid 38 below a surface level 37 of the quench liquid 38. Accordingly, the dip tube 48 may route the untreated syngas 20 through the interior 47 (e.g., passage or chamber) toward the quench liquid 38, such that the untreated syngas 20 impinges on and flows through (e.g., bubbles through) the quench liquid 38 around the lower end 50 of the dip tube 48 as indicated by arrow 52. The quench liquid 38 cools the untreated syngas 20 and becomes at least partially entrained in the untreated syngas 20, thereby producing a partially cooled syngas 20 with entrained quench liquid 38 (e.g., three-phase vapor-liquid-gas flow) as indicated by arrow 54. The entrained quench liquid 38 may increase the moisture content of the partially cooled syngas 54, and thus it may be desirable to separate at least a portion of the entrained quench liquid 38 from the partially cooled syngas 54.

The quench chamber 30 includes a draft tube 56 disposed about (e.g., coaxial with) the dip tube 48 and configured to improve contact between the untreated syngas 20 and the quench liquid 38 and facilitate entrainment of the quench liquid 38 by the untreated syngas 20. For example, the draft tube 56 (e.g., annular draft tube) may have a wall 58 (e.g., annular wall) extending circumferentially about the wall 49 of the dip tube 48, thereby defining an intermediate chamber or passage (e.g., annular passage or annulus 60). In operation, after cooling in the quench liquid 38, the untreated syngas 20 (e.g., partially cooled syngas 54) flows away from the quench bath 42 upwardly through the annulus 60 between the dip tube 48 and the draft tube 56, as shown by arrows 52 and 54. A geometry of the draft tube 56 adjacent to the lower end 50 of the dip tube 48 enables the untreated syngas 20 to entrain a sufficient amount of the quench liquid 38 as the untreated syngas 20 flows upwardly into the annulus 60, thereby generating the partially cooled syngas 54. The partially cooled syngas 54 flows through the draft tube 56 in a direction that is substantially opposite a direction of the untreated syngas 20 flowing through the dip tube 48. The directional change in the flow of the partially cooled syngas 54 through the annulus 60 may facilitate entrainment of the quench liquid 38 by the partially cooled syngas 54 to facilitate further cooling of the partially cooled syngas 54. For example, as the partially cooled syngas 54 flows upward through the annulus 60, the effective contact time between the partially cooled syngas 54 and the quench liquid 38 may be increased such that a desirable amount of the quench liquid 38 may be entrained within the partially cooled syngas 54.

In certain embodiments, the quench chamber 30 may include features that may facilitate removal of the entrained quench liquid 38 from the partially cooled syngas 54. For example, as discussed in further detail below, a capped droplet tube 62 (e.g., an inner annular baffle having a capped proximal end) may redirect the flow of the partially cooled syngas 54 from an upward direction to a downward direction as the partially cooled syngas 54 exits an outlet 64 of the draft tube 56, as shown by arrow 66. The partially cooled syngas 54 (e.g., redirected partially cooled syngas 66) exiting the outlet 64 of the draft tube 56 flows into a first annulus 70 between the capped droplet tube 62 and the draft tube 56.

The capped droplet tube 62 may have a first wall 72 and a second wall 74. The first wall 72 (e.g., planar wall or axial end wall) may be positioned adjacent to the quench ring 41 and may radially extend away from the wall 49 of the dip tube 48. The first wall 72 may form a cap or impingement surface 78 at an upper end 79 of the capped droplet tube 62. For example, the first wall 72 may be a cup-shaped wall, semi-spherical or oval wall, egg-shaped wall, bell-shaped wall, or any other suitable shape that may redirect the partially cooled syngas 54 from an upward flow direction to a downward flow direction. The second wall 74 (e.g., annular wall) of the capped droplet tube 62 is radially spaced apart from the walls 49, 58 of the tubes 48, 56, respectively, and extends axially away from the first wall 72 in a downward direction toward the quench bath 42. The walls 72, 74 are arranged such that the capped droplet tube 62 may have an L-shape or curved (e.g., r-shaped, C-shaped, or U-shaped) cross-section or profile. The walls 72, 74 define the first annulus 70 circumferentially surrounding at least a portion of the tubes 48, 56 such that, when the partially cooled syngas 54 exits the outlet 64 of the draft tube 56, the partially cooled syngas 54 flows into the first annulus 70 and the flow of the partially cooled syngas 54 is redirected from an upward direction to a downward direction. For example, the partially cooled syngas 54 exiting the outlet 64 of the draft tube 56 flows in the upward direction and impinges on the impingement surface 78 of the capped droplet tube 62. In this way, the capped droplet tube 62 redirects the flow of the partially cooled syngas 54 from the upward direction to the downward direction. Impingement and flow redirection of the partially cooled syngas 54 by the capped droplet tube 62 may decrease formation of droplets of the quench liquid 38 that may become entrained by the partially cooled syngas 54 exiting the outlet 64 of the draft tube 56. Additionally, impingement of the partially cooled syngas 56 on the impingement surface 78 may break momentum of the entrained quench liquid 38 in the partially cooled syngas 64 and allow entrained quench liquid 38 to coalesce, resulting in separation of the partially cooled syngas 54 from the entrained quench liquid 38. The capped droplet tube 62 may also mitigate formation of droplets of quench liquid 38 that may be entrained by the partially cooled syngas 62 by maintaining an annular mist flow of the quench liquid within the first annulus 70, thereby decreasing an amount of the entrained quench liquid 38 in the partially cooled syngas 54. The capped droplet tube 62 may also increase a flow velocity of the partially cooled syngas 54 exiting an outlet 82 of the capped droplet tube 62 to facilitate removal of a substantial portion of the entrained quench liquid 38 from the partially cooled syngas 54 before the partially cooled syngas 54 flows into a second annulus 80 (e.g., annular space between the wall 74 of the capped droplet tube 62 and a baffle 84) circumferentially surrounding the wall 58, 74 of the tubes 56, 62, respectively. For example, the outlet 82 of the capped droplet tube 62 may have a radial dimension that may increase a pressure, which may also increases the flow velocity, of the partially cooled syngas 54 as the partially cooled syngas 54 exits the capped droplet tube 62. The increased flow velocity of the partially cooled syngas 54 may allow the entrained quench liquid 38 to separate from the partially cooled syngas 54. Additionally, the capped droplet tube 62 expands flow paths and increases the effective residence time of the partially cooled syngas 62 within the quench chamber 30.

As discussed above, the capped droplet tube 62 is configured to change a flow direction of the partially cooled syngas 56. For example, the capped droplet tube 62 may have a configuration (e.g., a bend, turn, or curve) defined by the walls 72, 74 that may direct the partially cooled syngas 54 from an upward direction to a downward direction into the first annulus 70 toward the bottom of the quench bath 42. The change in the flow direction of the partially cooled syngas 54 (e.g., from an upward direction to a downward direction) may decrease a flow velocity of the partially cooled syngas 54 and, consequently, decrease the drag forces acting on the entrained quench liquid 38 by the partially cooled syngas 54. As such, at least a portion of the entrained quench liquid 38 may be separated from the partially cooled syngas 54 before the partially cooled syngas 54 flows into the second annulus 80 of the quench chamber 30. Moreover, a momentum of the entrained quench liquid 38 may cause the entrained quench liquid 38 to impinge on the walls 72, 74, resulting in separation of the entrained quench liquid 38 from the partially cooled syngas 54. Droplets of the separated entrained quench liquid 38 may flow downwardly toward the quench bath 42. In this way, the capped droplet tube 62 removes the entrained quench liquid 38 from the partially cooled syngas 54 and decreases formation of droplets of the quench liquid 38 that may become entrained by the partially cooled syngas 54 to generate a first cooled syngas 86 having a reduced content of the entrained quench liquid 38 (e.g., with a liquid water content of less than approximately 5, 10, 15, 20, or 25 percent) compared to the partially cooled syngas 54.

The capped droplet tube 62 may direct the first cooled syngas 86 into a bottom region 88 of the second annulus 80

(e.g., annular space between the outlet 82 of the capped droplet tube 62 and lower end 92 of the baffle 84). Directing the first cooled syngas 86 into the bottom region 88 of the second annulus 80 may increase a residence time of the first cooled syngas 86 within the second annulus 80. For example, without the disclosed embodiments, the partially cooled syngas 62 may exit the draft tube 52 through the draft tube outlet 66 and flow into an upper region 96 of the second annulus 80 (e.g., annular space between the quench ring 41 and the baffle 84) before exiting the quench chamber 30 through a syngas outlet 98. In certain embodiments, the syngas outlet 98 is positioned adjacent to the upper region 96 of the second annulus 80. Therefore, without the disclosed embodiments, a residence time of the partially cooled syngas 54 within the quench chamber 30 (e.g., in the second annulus 80) may not be sufficient for removal of a desirable amount of the entrained quench liquid 38 (e.g., liquid and/or vapor) that may remain in the partially cooled syngas 54 before the partially cooled syngas 54 exits the syngas outlet 98. However, it is now recognized that by positioning the capped droplet tube 62 adjacent to the draft tube outlet 64, the partially cooled syngas 54 (e.g., the redirected syngas stream 66) may be directed into the bottom region 88 of the second annulus, which would otherwise not be utilized. Moreover, the capped droplet tube 62 may create a longer and more tortuous flow path for the partially cooled syngas 54 compared to quench chambers that do not include the capped droplet tube 62. Therefore, the residence time of the first cooled syngas 86 in the second annulus 80 may be increased compared to embodiments that do not include the capped droplet tube 62.

Furthermore, the bottom region 88 may be cooler compared to the upper region 96 of the second annulus due, in part, to the proximity of the bottom region 88 to the bottom of the quench bath 42. Accordingly, directing the first cooled syngas 86 towards the bottom region 88 may further cool the first cooled syngas 86, which may allow additional entrained quench liquid 38 (e.g., liquid and/or vapor) to be separated from the first cooled syngas 86. In this way, the quench chamber 30 may remove a desirable amount of the entrained quench liquid 38 (e.g., between approximately 95% and approximately 99%) from the partially cooled syngas 54 to generate a first portion 100 of a second cooled syngas 104 having less than approximately 1, 2, 3, 4, or 5 percent entrained quench liquid 38.

A portion of the first cooled syngas 86 exiting the outlet 82 of the capped droplet tube 62 may flow into the upper region 96 of the second annulus 80, which may allow for additional cooling and removal of the entrained quench liquid 38. For example, while in the second annulus 80, a syngas portion 110 of the first cooled syngas 86 flows in the upward direction into the upper region 96 and radially expands to fill the upper region 96 of the second annulus 80. Expansion of the syngas portion 110 decreases a flow velocity of the syngas portion 110, which decreases the drag forces acting on the entrained quench liquid 38 by the first cooled syngas 86. As such, the syngas portion 110 may no longer have a sufficient flow velocity to carry as much entrained quench liquid 38. Consequently, at least a portion of entrained quench liquid 38 may be separated from the syngas portion 110 to generate a second portion 112 of the second cooled syngas 104. The second portion 112 of the second cooled syngas 104 may exit the second annulus 80 through openings 114 on the baffle 84, and may be mixed with the first portion 100 of the second cooled syngas 104 in a vapor space 118.

Figure 4:
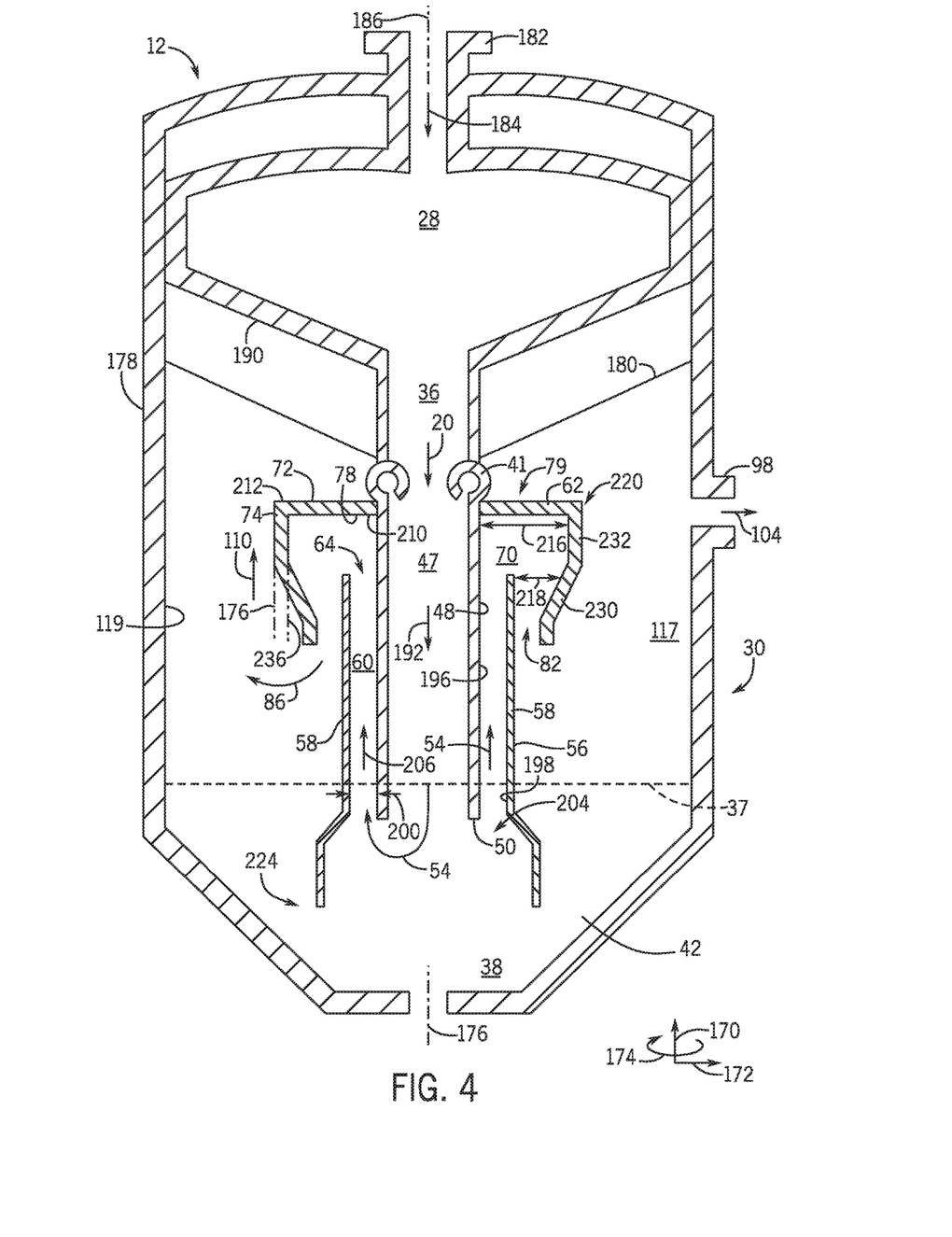
FIG. 4 is a cross-sectional view of an embodiment of the gasification vessel of FIG. 3, whereby the quench chamber does not include a baffle circumferentially surrounding the droplet tube.

In certain embodiments, the quench chamber 30 may not include the baffle 84 (e.g., see FIG. 4). In this particular embodiment, the cooled syngas (e.g., the first cooled syngas 84 exiting the capped droplet tube 62 may flow into a vapor space 117 between the second wall 74 (e.g. annular wall) of the capped droplet tube 62 and an inner wall 119 (e.g., annular wall) of the quench chamber 30. The cooled syngas may expand to fill the vapor space, shedding the entrained quench liquid 38 before exiting the quench chamber 30 through the syngas outlet 98.

Returning to FIG. 1, following removal of the entrained quench liquid 38, the second cooled syngas 104 may exit the gasification vessel 12 via the syngas outlet 98 and may flow into a syngas treatment system 120. The syngas treatment system 120 is configured to remove residual particulates (e.g., slag, soot, unconverted carbon, etc.) and moisture from the second cooled syngas 104 and to generate treated syngas 124. For example, the syngas treatment system 120 may include a scrubber 126 that utilizes water to remove the residual particulates and other components from the second cooled syngas 104 that may have been carried over from the gasification vessel 12. The scrubber 126 may receive fluid (e.g., deaerated water) from a deaerator 130 via scrubber line 132. The fluid from the deaerator 130 may facilitate removal of the residual particulates from the second cooled syngas 104 and produce a second stream of black water 136 (e.g., mixture of water and removed residual particulates). In certain embodiments, the black water 136 may be directed to the black water treatment system 46 for additional processing (e.g., recovery of unconverted carbon, disposal, etc.). In other embodiments, the black water 136 may be circulated to the gasification vessel 12. For example, as indicated by line 138, at least a portion of the black water 136 may be directed to the quench chamber 30 (e.g., the dip tube 48 via the quench ring 41 and/or the bottom of the quench bath 42) and used to cool the untreated syngas 20. In one embodiment, a portion of the black water 136 may be directed to the reactor 28, as indicated by line 140. The reactor 28 may gasify the unreacted carbon in the black water 136, thereby increasing the efficiency of the gasification system 10 compared to gasification system that do not recover and gasify unconverted carbon.

In addition to the scrubber 126, the syngas treatment system 120 may also include other components, such as a shift reactor 142 to increase the hydrogen content of the syngas, a low temperature gas cooling (LTGC) train 146 to cool the syngas, and/or an acid gas removal (AGR) unit 148, to remove any other remaining undesirable impurities (e.g., acid gases such as hydrogen sulfide ($H_2S$), etc.) from the second cooled syngas 104 to generate the treated syngas 124. The treated syngas 124 may then be used for a variety of processes such as chemical processing or power generation (e.g., gas turbine, etc.). For example, the treated syngas 124 may be directed to a power production system 150 (e.g., gas turbine 152 drivingly coupled to generator 154).

The gasification system 10 may also include a controller 156 to govern operation of the gasification system 10. The controller 156 may independently control operation of the gasification system 10 by electrically communicating with sensors, control valves, and pumps or other flow adjusting features throughout the gasification system 10. The controller 156 may include a distributed control system (DCS) or any computer-based workstation that is fully or partially automated. For example, the controller 156 can be any device employing a general purpose or an application-specific processor 158, both of which may generally include memory circuitry 160 for storing instructions such as gasification parameters (e.g., the gasification conditions of the feedstock 16). The processor 156 may include one or more processing devices, and the memory circuitry 160 may include one or more tangible, non-transitory, machine-readable media collectively storing instructions executable by the processor to control actions described herein.

In one embodiment, the controller 156 may operate control devices (e.g., valves, pumps, etc.) to control amounts and/or flows between the different system components. It should be noted that there may be valves throughout the gasification system 10 used to adjust different amounts and/or flows between the system components. For example, the controller 156 may also govern operation of valves to control an amount or adjust a flow of the feedstock 16, the gasifying agent 24, and the steam 26 that enters the gasifier 14. In certain embodiments, the control device may be part of a weighing or metering system that measures the amount of the feedstock 16 before it enters the gasifier 14. Additionally, the controller 156 may adjust the amount of the quench liquid 38 supplied to the quench chamber 30 to maintain a quench vaporization level suitable for cooling the untreated syngas 20.

In certain embodiments, the controller 156 may use information provided via input signals to execute instructions or code contained on a machine-readable or computer-readable storage medium 160 and generate one or more output signals 162 to the various control devices (e.g., valves and pumps) to control a flow of fluids (e.g., the feedstock 16, gasifying agent 24, steam 26, quench liquid 38, second cooled syngas 104, black water 136, treated syngas 124, or any other suitable fluid throughout the gasification system 10.

Figure 2:
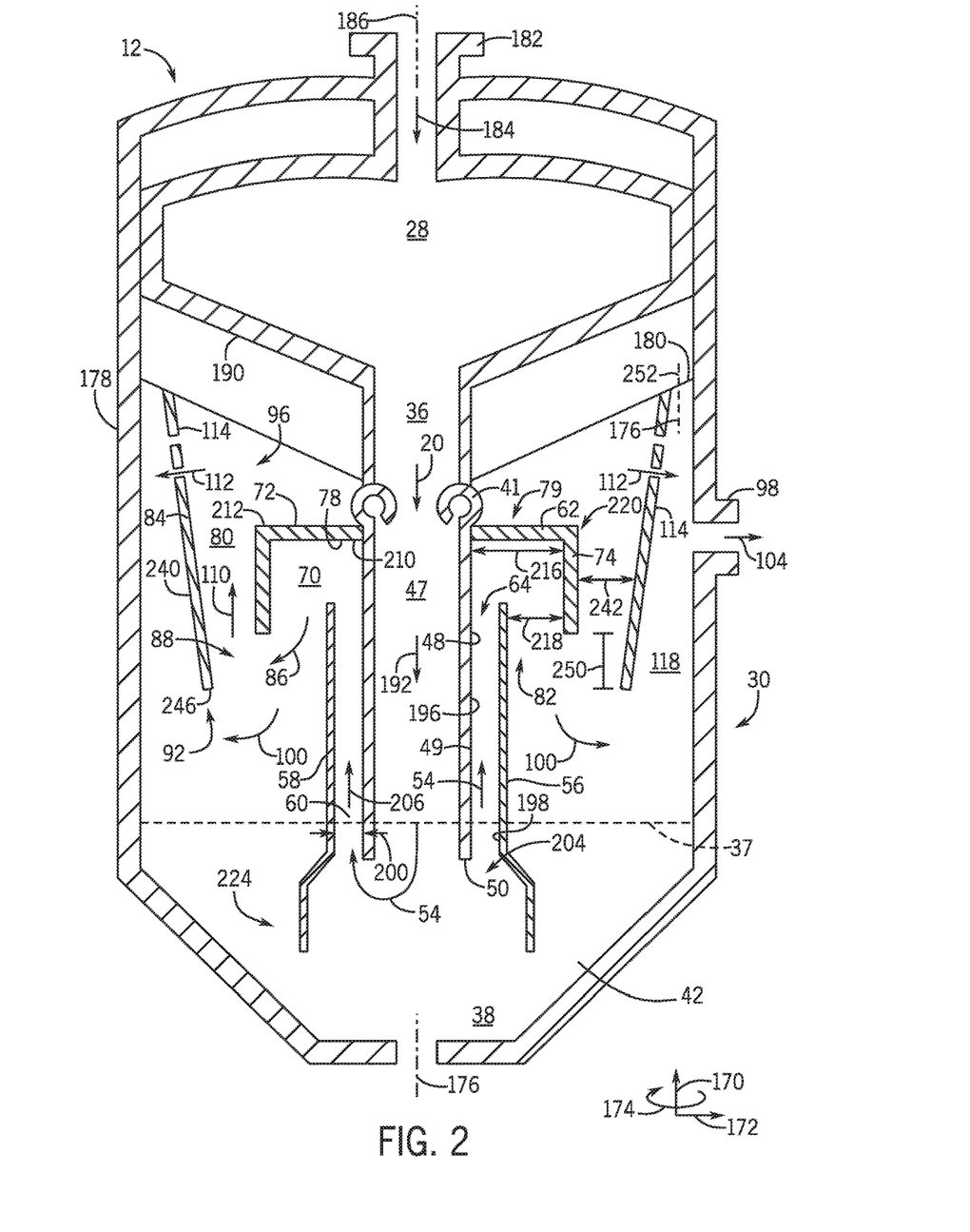
FIG. 2 is a cross-sectional view of an embodiment of the gasification vessel of FIG. 1, whereby the droplet tube is positioned adjacent to an outlet of the draft tube.

As discussed above, the gasification system 10 may be configured to remove entrained liquid 38 (e.g., water) from the partially cooled syngas 54. For example, the quench chamber 30 may include one or more features that facilitate removal of entrained liquid 38 from the partially cooled syngas 54. Turning now to FIG. 2, a cross-sectional view of an embodiment of the gasification vessel 12 is illustrated. The gasification vessel 12 may have an axial axis or direction 170, a radial axis or direction 172 away from axis 170, and a circumferential axis or direction 174 around axis 170. For example, the axis 170 corresponds to a longitudinal centerline 176 or lengthwise direction, the axis 172 corresponds to a crosswise or radial direction relative to the longitudinal centerline 176, and the axis 174 corresponds to the circumferential direction about the longitudinal centerline 176. As noted above, the gasification vessel 12 includes the reactor 28 and the quench chamber 30 in a coaxial arrangement (e.g., along axial axis 170). The gasification vessel 12 includes an enclosure 178, also referred to as a shell (e.g., an annular shell), that functions as a housing or outer casing for the gasification vessel 12 (e.g., an annular vessel). The gasification vessel 12 may also include a reactor floor 180 that separates the reaction chamber 28 from the quench chamber 30 and incorporates bottom end 36 thereby enabling the products from reactor 28 to flow into quench chamber 30. The gasification vessel 12 may also include features that facilitate coupling of the gasification vessel 12 to a source for the feedstock 16 used to generate the syngas (e.g., untreated syngas 20 and treated syngas 124). For example, the gasification vessel 12 may include an inlet 182 (e.g., an axial port at the apex of the gasification vessel 12) configured to receive a feed injector that supplies the gasifier 14 (e.g., reactor 28) with the feedstock 16, as indicated by arrow 184. In the illustrated embodiment, the inlet 182 and thus the feed injector is disposed along a central axis 186 of the gasification vessel 12. However, in some embodiments, one or more inlets 182 and associated feed injectors may be coupled to the gasification vessel 12 at an offset distance from the central axis 186, such as along a side wall and/or top wall of the enclosure 178. In certain embodiments, the injector may supply the gasifier 14 with the steam 26, gasifying agent 24 (e.g., oxidant), or any other suitable fluid to facilitate gasification of the feedstock 16 within the gasifier 14.

The gasifier 14 may also include a protective barrier 190. As discussed above, the gasifier 14 is configured to partially oxidize the feedstock 16 within the reactor 28 at temperatures in excess of approximately 700° C. and pressures of at least approximately 20 bar. The protective barrier 190 may improve the durability of the gasifier 14 by decreasing temperature and pressure effects associated with gasification of the feedstock 16. Accordingly, the protective barrier 190 may define the reactor 28 and the bottom end 36, and may be supported by in part by the reactor floor 180 (e.g., reactor wall). The protective barrier 190 may act as a physical barrier, a thermal barrier, a chemical barrier, or any combination thereof. Examples of materials that may be used for the protective barrier 190 include, but are not limited to, refractory materials, refractory metals, non-metallic materials, clays, ceramics, cements, and oxides of aluminum, silicon, magnesium, and calcium. In addition, the materials used for the protective barrier 190 may be bricks, castable, coatings, or any other suitable material, or combination thereof. Furthermore, in certain embodiments the protective barrier 190 may include a cooling wall or a surface wetting film for additional vessel protection. In certain embodiments, the protective barrier 190 may also coat the quench ring 41.

As discussed above, the dip tube 48 receives the untreated syngas 20 from the reactor 28 and directs the untreated syngas 20 into the quench liquid 38 in a first direction 192 (e.g., downward direction) toward the bottom of the quench bath 42 to generate the partially cooled syngas 54. Following cooling of the untreated syngas 20, the partially cooled syngas 54 is directed into the annulus 60 of the draft tube 56 that is formed between the wall 49 (e.g., an outer wall surface 196) of the dip tube 48 and the wall 58 (e.g., an inner wall surface 198) of the draft tube 56, where the partially cooled syngas 54 may be directed to the capped droplet tube 62 to facilitate removal of the entrained quench liquid 38 downstream of the draft tube outlet 64.

A portion of the draft tube 56 includes a first inner dimension 200 (e.g., radial gap between walls 49 and 58). In certain embodiments, the first inner dimension 200 may be constant (e.g., non-varying) between a syngas inlet end 204 (e.g., adjacent to the lower end 50 of the dip tube 48) and the draft tube outlet 64, as illustrated in FIG. 2. However, in other embodiments, the first inner dimension 200 may vary between the syngas inlet end 204 and the draft tube outlet 64. For example, the first inner dimension 200 of at least a portion of the annulus 60 may increase axially 170 in a second direction 206 (e.g., upward direction) that is substantially opposite the first direction 192. For example, the first inner dimension 200 of the annulus 60 (or diameter of the draft tube 56) may increase toward the draft tube outlet 64, such that a widest dimension 200 of the annulus 60 (or widest diameter of the draft tube 56) may be located at the draft tube outlet 64. Therefore, the annulus 60 between the dip tube 48 and the draft tube 56 may have a tapered or diverging geometry (e.g., a diverging annular flow path or progressively increasing annular cross-section). Similarly, the draft tube 56 may have a tapered or diverging configuration (e.g., a conical wall structure or progressively expanding annular wall structure), such that the draft tube 56 is broader at the draft tube outlet 64 relative to the syngas inlet end 204. In other words, the draft tube 56 may be described as a diverging annular draft tube 56 with an annular wall 58, 198, which gradually diverges away from the wall 49, 196 of the dip tube 48 to create a diverging annular passage or annulus 60.

The tapered configuration of the annulus 60 may increase a flow area of the partially cooled syngas 54 through the draft tube 56, which may decrease a velocity of the partially cooled syngas 54 and facilitate removal of the entrained quench liquid 38. For example, the tapered configuration may cause the partially cooled syngas 54 to radially 172 expand (e.g., diverge away from a central axis) to fill the annulus 60 of the draft tube 56. As the partially cooled syngas 54 diffuses through the annulus 60, the velocity of the partially cooled syngas 54 decreases and a residence time of the partially cooled syngas 54 within the draft tube 56 may be increased. Accordingly, the drag forces applied by the partially cooled syngas 54 on the entrained quench liquid 38 may be decreased, thereby facilitating separation of the entrained quench liquid 38 from the partially cooled syngas 54.

As discussed above, the flow of the partially cooled syngas 54 may be redirected into the first annulus 70 upstream of the second annulus 80 and the vapor space 118. For example, the capped droplet tube 62 may be positioned at the draft tube outlet 64 such that as the partially cooled syngas 54 exits the draft tube outlet 64 and is directed into the first annulus 70 by the capped droplet tube 62. For example, as discussed above, the capped droplet tube 62 includes walls 72, 74. The first wall 72 includes an end 210 (e.g., inner radius or circumference) that is coupled to the wall 49 of the dip tube 48 and a second end 212 (e.g., outer radius or circumference) that radially extends a distance 216 away from the wall 49 of the dip tube 46. As such, the first wall 72 forms a capped upper end (e.g., the upper end 79) of the capped droplet tube 62. The second wall 74 is radially 172 spaced apart from the walls 49, 58 of the tubes 48, 56, respectively, and extends axially 170 away from the first wall 72 (e.g., from the end 212) in the first direction 192 (e.g., downward direction) toward the quench bath 42. For example, the second wall 74 may be radially 172 spaced apart from the wall 49 of the dip tube 48 by the distance 216, and may be radially 172 spaced apart from the wall 58 of the draft tube 56 a distance 218. The distance 218 may be between approximately 5% and approximately 75% less than the distance 216. For example, the distance 218 may be approximately 5%, 10%, 15%, 20%, 25%, 30%, 40%, 50%, 60%, or 75% less than the distance 216. Accordingly, the second wall 74 defines the first annulus 70 downstream of the outlet 64 of the draft tube 56. The walls 72, 74 of the capped droplet tube 72 may form a turn 220 (e.g., a bend, or curved wall portion), which may turn at least 45 to 270, 50 to 225, 75 to 180, or 90 to 160 degrees. For example, the turn 220 may turn at least greater than or equal to approximately 45, 60, 75, 90, 120, 150, or 180 degrees. Therefore, as the partially cooled syngas 54 exits the outlet 64 of the draft tube 56, the first wall 72 of the capped droplet tube 62 blocks the flow of the partially cooled syngas 54 from flowing into the second annulus 80 of the quench chamber 30 and directs the flow of the partially cooled syngas 54 into the first annulus 70 defined by the second wall 74 of the capped droplet tube 62.

The wall 72 of the capped droplet tube 62 facilitates separation of the entrained quench liquid 38 from the partially cooled syngas 54 and redirection of the partially cooled syngas 54 exiting the outlet 64 of the draft tube 56. For example, as the partially cooled syngas 54 exits the outlet 64 of the draft tube 56, the partially cooled syngas 54 impinges on the impingement surface 78 of the wall 72. Impingement of the partially cooled syngas 54 on the impingement surface 78 may suppress the formation of small droplets of the entrained quench liquid 38 such that the droplets of the entrained quench liquid 38 may not be carried by the partially cooled syngas 54, thereby separating the quench liquid 38 from the partially cooled syngas 54.

Additionally, the impingement surface 78 may allow a change in the flow direction of the partially cooled syngas 54 from the second direction 206 (e.g., upward direction) to a direction substantially similar to the first direction 192 (e.g., the downward direction), thereby redirecting the partially cooled syngas 54 into the first annulus 70.

Directing the partially cooled syngas 54 into the first annulus 70 expands the flow path of the partially cooled syngas 54 and increases the residence time of the partially cooled syngas 54 within the quench chamber 30. Therefore, the effective residence time of the cooled syngas within the quench chamber 30 may be increased, thereby improving separation of the entrained quench liquid 38 from the partially cooled syngas 54 before the syngas exits the gasification vessel 12 through the syngas outlet 98. Moreover, turn 220 of the capped droplet tube 62 may facilitate the entrained quench liquid 38 to drop out of the partially cooled syngas 54. For example, the heavier droplets of the entrained quench liquid 38 may be unable to make the turn 220 due to momentum compared to the untreated syngas 20 in the in the partially cooled syngas 54. As such, the heavier droplets of the entrained quench fluid 38 may come out of the partially cooled syngas 54, while the untreated syngas 20 may continue to move through the turn 220 and towards the second annulus 80, thereby generating the first cooled syngas 86.

Figure 3:
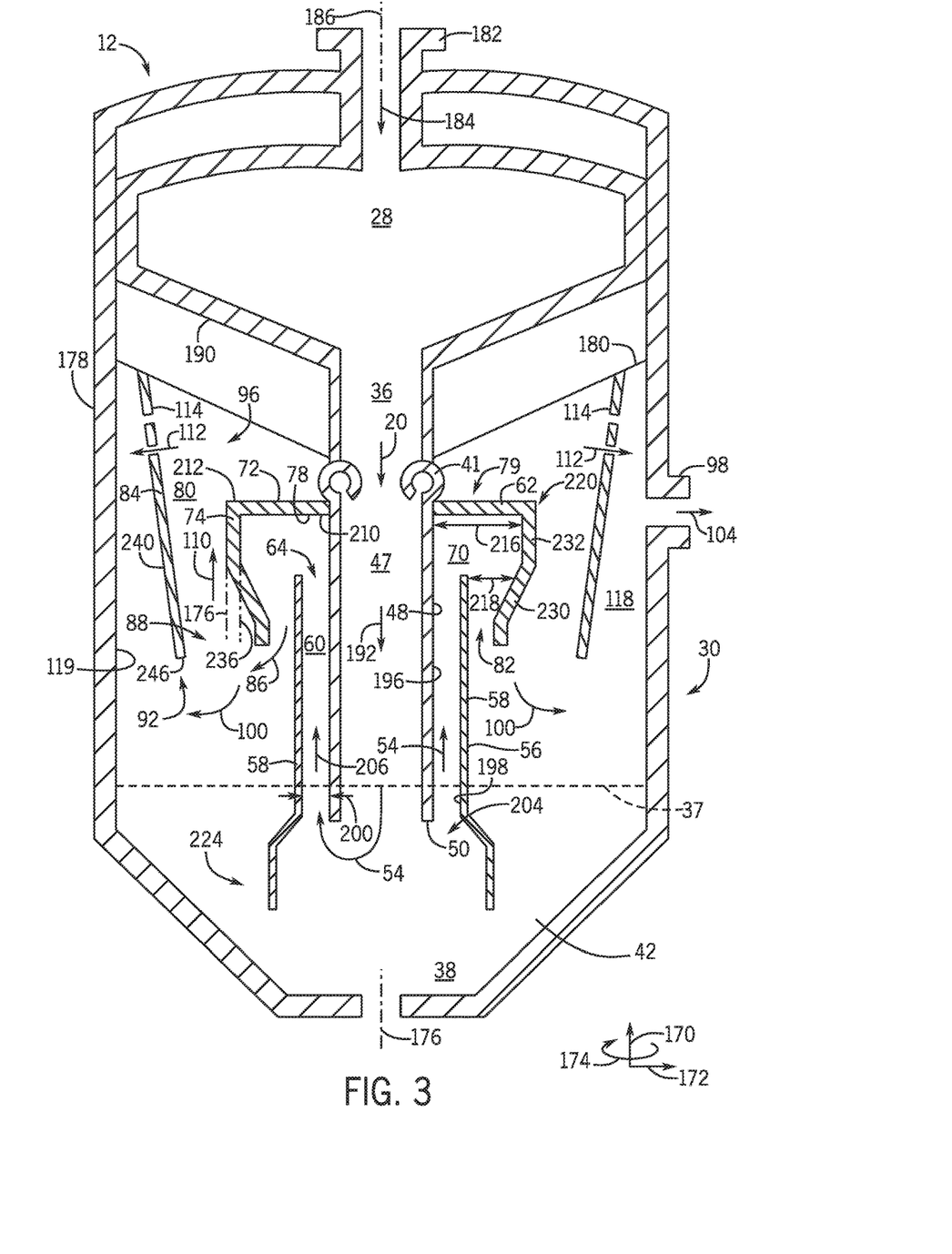
FIG. 3 is a cross-sectional view of an embodiment of the gasification vessel of FIG. 1, whereby a portion of the droplet tube is positioned at an angle relative to the draft tube.

In certain embodiments, the capped droplet tube 62 may have a convergent (e.g., tapered) configuration. FIGS. 3 and 4 illustrate an embodiment of the capped droplet tube 62 in which at least a portion of the wall 74 is oriented at an angle. For example, in the illustrated embodiment, a first wall portion 230 of the wall 74 extends radially 172 away from a second wall portion 232 of the capped droplet tube 62 and toward the draft tube 56 at an acute angle 236 relative to the axis 176 at the interface between the first wall portion 230 and the second wall portion 232. The angle 236 may be equal to, less than, or greater than approximately 5, 10, 15, 20, 25, 30, 35, 40, 45, 50, 55, 60, 65, 70, or 75 degrees. In certain embodiments, the angle 236 may be approximately 1 to 60, 1 to 45, 1 to 30, or 5 to 15 degrees. As such, the distance 218 between the wall 74 of the capped droplet tube 62 and the wall 58 of the draft tube 56 may gradually decrease toward the outlet 82 of the capped droplet tube 62. The narrowing distance 218 may increase a flow velocity of the partially cooled syngas 54 exiting the outlet 82 of the capped droplet tube 62. The increased flow velocity of the partially cooled syngas 54 may facilitate separation of the entrained quench liquid 38 from the partially cooled syngas 54 to generate the first cooled syngas 86. For example, the tapered configuration of the capped droplet tube 62 may maintain annular mist flow of the quench liquid 38 within the first annulus 70 and block formation of droplets that may become entrained by the partially cooled syngas 54.

In operation, the untreated syngas 20 flows downwardly (e.g., downward first flow direction 192) through the dip tube 48, into the quench liquid 38, around the lower end 50 of the dip tube 48 as indicated by arrow 54, into a bottom section 224 of the draft tube 56, and upwardly into the annulus 60 between the dip tube 48 and the draft tube 56. In this manner, the untreated syngas 20 is cooled by and entrains at least some of the quench liquid 38, thereby directing the partially cooled syngas 54 with entrained quench liquid 38 into the draft tube 56. In addition to factors like syngas composition, temperature and pressure, and temperature of the quench liquid 38, the flow velocity of the syngas 20, 54 may decrease, increase or remain substantially the same as it flows from the dip tube 48 into the draft tube 56 based on the ratio (e.g., lesser than, greater than, or equal to 1) of cross-sectional flow area of the dip tube 48 relative to the cross-sectional flow area of the annulus 60 between the dip tube 48 and the draft tube 54. The configuration of the draft tube 54 improves the effective contact time between the syngas 20 and the quench liquid 38 such that the syngas 20 entrains a substantial portion of the quench liquid 38. In this way, the syngas 20 may be cooled. Once inside the annulus 60, the partially cooled syngas 54 flows upwardly (e.g., upward second flow direction 206) between the wall 49 of the dip tube 48 and the wall 58 of the draft tube 56. The partially cooled syngas 54 exits the draft tube 56 via the outlet 64 and impinges on the impingement surface 78 of the capped droplet tube 62, which redirects the flow of the partially cooled syngas 54. As noted above, redirecting the flow of the partially cooled syngas 54 may help to reduce a flow of the partially cooled syngas 62 into the first annulus 70 and increase a flow of at least a portion of the first cooled syngas 86 into the bottom region 88 of the second annulus 80, thereby increasing the effective residence time of the cooled syngas 54, 86 in the quench chamber 30 to allow more time for the entrained quench liquid 38 to drop out of the flow of the cooled syngas 54, 86.

As discussed above, the capped droplet tube 62 is configured to redirect the flow of the partially cooled syngas 54 such that the flow of the partially cooled syngas 54 exiting the outlet 64 of the draft tube 56 diverges from the second flow direction 206. The partially cooled syngas 54 may be redirected toward the bottom region 88 of the second annulus 80 rather than to the upper region 96 of the second annulus 80, as in certain existing gasification systems. For example, returning to FIG. 2, the configuration of the capped droplet tube 62 may direct the partially cooled syngas 54 such that the partially cooled syngas 54 radially 172 diverges away from the dip tube 48 and flows in the first direction 192 (e.g., downward direction) into the bottom region 88 of the second annulus 80. Accordingly, the walls 72, 74 may be curved in a manner that directs the flow of the partially cooled syngas 54 in the first direction 192 and into the bottom region 88 of the second annulus 80.

The wall 72, 74 (e.g., annular wall) defines the turn 220 that enables the capped droplet tube 62 to redirect the flow of the partially cooled syngas 54 from the upward second direction 206 to the downward first direction 192 and toward the bottom region 88 of the second annulus 80. As the partially cooled syngas 54 exits the draft tube outlet 64 and flows into the first annulus 70 (e.g., an annular passage defined by the walls 72, 74) the partially cooled syngas 54 impinges the impingement surface 78. The impingement surface 78 is configured to redirect the flow of the partially cooled syngas 54 such that the partially cooled syngas 54 flows in the first direction 192 and into the bottom region 88 of the second annulus 80. Moreover, the changes in flow direction of the partially cooled syngas 54 resulting from the turn 220 of the walls 72, 74 may increase the overall length and tortuous nature of the flow path through the quench chamber 30. In this way, the effective residence time of the untreated syngas 20 in the quench chamber 30 may be increased, thereby allowing a desirable amount of the entrained quench liquid 38 to be removed from the cooled syngas (e.g., the cooled syngas 54, 86) before the cooled syngas exits the quench chamber 30 through the syngas outlet 98. Furthermore, as discussed above, the momentum differences between the entrained quench liquid 38 and the untreated syngas 20 in the partially cooled syngas 54 may not allow the droplets of the entrained quench liquid 38 to keep up with the lower density untreated syngas 20 as the turn 220 redirects the partially cooled syngas 54 in the downward direction 192, thereby facilitating separation of the entrained quench liquid 38 and the untreated syngas 20.

In addition to redirecting the flow of the partially cooled syngas 54, the capped droplet tube 62 serves as a shear plate to facilitate coalescence of the entrained quench liquid 38, thereby separating at least a portion of the entrained quench liquid 38 from the partially cooled syngas 54 to generate the first cooled syngas 86. The first cooled syngas 86 may have between approximately 5% and approximately 25% less entrained quench liquid 38 compared to the partially cooled syngas 54. In certain embodiments, the capped droplet tube 62 may include a gutter that may collect the entrained quench liquid 38 that is separated from the partially cooled syngas 54 to mitigate re-entrainment of the separated quench liquid 38. The entrained quench liquid 38 that is separated from the partially cooled syngas 54 may be recycled and reused for cooling of the untreated syngas 20 and/or other downstream processes.

While in the bottom region 88 of the second annulus 80, the first cooled syngas 86 may radially 172 expand and change flow directions from the first direction 192 (e.g., downward direction) to the second direction 206 (e.g., upward direction) to fill the second annulus 80 and the vapor space 118. The radial expansion and change in flow direction from the first direction 192 to the second direction 206 may decrease the flow velocity of the first cooled syngas 86. Consequently, the drag forces acting on remaining entrained quench liquid 38 by the first cooled syngas 86 may also be decreased. Therefore, the entrained quench liquid 38 may be shed from the first cooled syngas 86 to generate the first portion 100 of the second syngas 104. The first portion 100 of the second syngas 104 may mix with the second portion 112 of the second syngas 104 (e.g., portion generated in the second annulus 80) as the first portion 100 flows toward the syngas outlet 98.

As discussed above, the second portion 112 of the second cooled syngas 104 may be generated from the syngas portion 110 of the first cooled syngas 86 in the second annulus 80, which is positioned axially 170 above the capped droplet tube 62. For example, upon exiting the outlet 82 of the capped droplet tube 62, the baffle 84 may direct the syngas portion 110 of the first cooled syngas 86 into the second annulus 80. The baffle 84 includes a baffle wall 240 that is radially 172 spaced apart a distance 242 from the wall 74 of the capped droplet tube 62. The baffle wall 240 extends from the reactor floor 180 toward the quench bath 42 such that an end 246 of the baffle wall 240 is a distance 250 below the outlet 82 of the capped droplet tube 62. In this way, the baffle 84 may direct the syngas portion 110 of the first cooled syngas 86 toward the second annulus 80 to increase the residence time of the first cooled syngas 86 within the quench chamber 30 and allow additional entrained quench liquid 38 to be separated from the first cooled syngas 86 before exiting the quench chamber 30.

In certain embodiments, the baffle wall 240 may be positioned vertically (e.g., axially 170) within the quench chamber 30, such that the distance 242 between the baffle wall 240 and the wall 74 is constant (e.g., in embodiments where the capped droplet tube 62 does not have a tapered configuration). However, in other embodiments, the distance 242 between the baffle wall 240 and the wall 74 is variable. For example, as illustrated in FIG. 2, the baffle wall 240 is oriented toward the wall 74 of the capped droplet tube 62 at an angle 252 relative to the axis 176 of the gasification vessel 12. The angle 252 may be equal to, less than, or greater than approximately 5, 10, 15, 20, 25, 30, 35, 40, 45, 50, 55, 60, 65, 70, or 75 degrees. In certain embodiments, the angle 252 may be approximately 1 to 60, 1 to 45, 1 to 30, or 5 to 15 degrees. As such, the distance 242 between the baffle wall 240 and the wall 74 of the capped droplet tube 62 may gradually decrease toward the outlet 82 of the capped droplet tube 62. The narrowing distance 242 may increase a flow velocity of the syngas portion 110 of the first cooled syngas 86 as the syngas portion 110 flows from the bottom region 88 to the upper region 96 of the second annulus 80. The syngas portion 110 radially 172 expands to fill the upper region 96 of the second annulus 80, where the entrained quench liquid 38 is separated from the syngas portion 110 to generate the second portion 112 of the second syngas 104 in a manner similar to the separation of the entrained quench liquid 38 from the partially cooled syngas 54 in the first annulus 70. For example, a flow velocity of the syngas portion 110 decreases as it radially 172 expands to fill the upper region 96 of the second annulus 80, which results in a decrease in the drag forces acting on the entrained quench liquid 38 by the syngas portion 110 of the first cooled syngas 86. The entrained quench liquid 38 separated from the syngas portion 110 may flow in the first direction 192 toward the quench bath 42 to be recycled. In certain embodiments, the baffle end 246 may include a gutter that may collect and direct the separated quench liquid 38 to the quench bath 42 of the quench chamber 30. The second portion 112 may exit the second annulus 80 through the openings 114 (e.g., annular passages) and into the vapor space 118. While in the vapor space 118, the second portion 112 may mix with the first portion 100 of the second cooled syngas 104 before exiting the quench chamber 30 through the syngas outlet 98. To mitigate re-entrainment of the quench liquid 38 separated from the syngas portion 110, the openings 114 may be positioned above the syngas outlet 98. In this way, the quench liquid 38 separated from the syngas portion 110 may not flow into the vapor space 118 through the openings 114. Additionally, the openings 114 may be sized such that fine particulates (e.g., ash, slag, unreacted carbon, and any other fine solids in the cooled syngas) may not accumulate and plug the openings 114.

As described above, certain embodiments of the gasification system 10 may include a capped droplet tube (e.g., the capped droplet tube 62) circumferentially surrounding at least a portion of the dip tube 48 and the draft tube 56 in the quench chamber 30. The capped droplet tube 62 may redirect a flow of the partially cooled syngas 54, which may decrease the velocity of the partially cooled syngas 54 and thereby facilitate removal of the entrained quench liquid 38 by reducing the drag forces acting on the entrained quench liquid 38 by the partially cooled syngas 54. Additionally, the capped droplet tube 62 may mitigate formation of droplets of the quench liquid 38 that may become entrained by the partially cooled syngas 54 by maintaining annular mist flow within the annulus 70 between the tubes 56, 62. Moreover, the capped droplet tube 62 may increase a residence time of the untreated syngas 20 by increasing a flow path length of the untreated syngas 20 through the quench chamber 30, which may also facilitate removal of the entrained quench liquid 38 to generate the second cooled syngas 104. For example, the capped droplet tube 62 may direct the flow of the partially cooled syngas 54 into the lower portion 88 of the second annulus 80. As such, the partially cooled syngas 54 may be forced into the lower portion 88 of the second annulus 80 that would otherwise not be utilized, thereby increasing the effective residence time of the partially cooled syngas 54 in the quench chamber. Furthermore, the baffle 84 directs a portion of the cooled syngas 86 into the upper region 96 of the second annulus 80 to allow the cooled syngas 86 to shed additional entrained quench liquid 38 before entering the vapor space 118 and exiting the quench chamber 30. In this way, the second cooled syngas 104 may have substantially less entrained quench liquid 38 compared to the partially cooled syngas 54.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a quench system configured to cool a syngas generated in a gasification chamber, wherein the quench system comprises:
        a quench chamber;
        a dip tube configured to direct the syngas from the gasification chamber into a quench liquid in the quench chamber to cool the syngas and to generate a first cooled syngas;
        a draft tube disposed circumferentially about the dip tube and configured to receive the first cooled syngas in a first direction along a first passage, wherein the first passage is disposed between a first wall of the dip tube and a second wall of the draft tube;
        a droplet tube configured to receive the first cooled syngas from the first passage, wherein the droplet tube comprises a third wall configured to redirect a flow of the first cooled syngas in a second direction different from the first direction; and
        a baffle comprising a fourth wall axially extending from the gasification chamber toward the quench chamber, wherein the fourth wall axially overlaps with at least portions of the first wall of the dip tube, the second wall of the draft tube, and the third wall of the droplet tube.

2. The system of claim 1, comprising a second passage disposed between the second wall of the draft tube and the third wall of the droplet tube, wherein the second passage is configured to receive the redirected flow of the first cooled syngas and to generate a second cooled syngas.

3. The system of claim 2, wherein a radial dimension of the second passage gradually decreases toward an outlet of the droplet tube.

4. The system of claim 1, wherein a first portion of the third wall radially extends away from the first wall of the dip tube and a second portion of the third wall is radially spaced apart from the second wall of draft tube and extends axially away from the first portion of the third wall such that the third wall turns between an inlet of the droplet tube and an outlet of the droplet tube.

5. The system of claim 4, wherein the second portion of the third wall converges toward the draft tube such that the droplet tube has a tapered configuration.

6. The system of claim 1, wherein the third wall extends circumferentially about a central axis of the dip tube.

7. The system of claim 1, wherein the third wall of the droplet tube comprises an impingement surface adjacent to a draft tube outlet and configured to redirect the first cooled syngas from the first direction to the second direction.

8. The system of claim 1, wherein the baffle is radially spaced away from the droplet tube and extends circumferentially about a central axis of the dip tube.

9. The system of claim 8, comprising a third passage disposed between the third wall of the droplet tube and the fourth wall of the baffle and configured to receive a second cooled syngas generated in the droplet tube, wherein the third passage comprises an upper region and a bottom region.

10. The system of claim 9, wherein the fourth wall of the baffle comprises one or more openings disposed adjacent to the upper region of the third passage and a syngas outlet of the quench chamber.

11. The system of claim 9, wherein the fourth wall of the baffle converges toward the droplet tube such that a radial dimension of the third passage decreases from the upper region to the bottom region of the third passage.

12. The system of claim 1, wherein a first outlet of the droplet tube is positioned radially away and below a second outlet of the draft tube.

13. The system of claim 1, comprising a gasifier having a housing, the gasification chamber disposed in the housing, and the quench system disposed in the housing downstream of the gasification chamber.

14. A system, comprising
a draft tube configured to mount about a dip tube in a quench system of a gasifier downstream from a gasification chamber, wherein the draft tube is configured to receive a first cooled syngas flow from a quench liquid in a first direction;
a droplet tube comprising a wall configured to redirect a flow of the first cooled syngas in a second direction different from the first direction; and
a baffle adjacent to the droplet tube and extending away from the gasification chamber, wherein the baffle comprises a baffle wall that axially overlaps with at least portions of the draft tube and the wall of droplet tube.

15. The system of claim 14, wherein the wall is positioned adjacent to and axially away from an outlet of the draft tube and radially extends away from the dip tube, wherein the wall comprises an impingement surface configured to redirect the flow of the first cooled syngas into a passage disposed between a first wall of the draft tube and a second wall of the droplet tube.

16. The system of claim 14, wherein the wall extends circumferentially about a central axis of the draft tube and has a first wall portion axially spaced apart from a first outlet of the draft tube and radially extending away from the dip tube and a second wall portion that is radially spaced apart from the draft tube and extends axially away from the first wall portion such that the wall turns between an inlet of the droplet tube and a second outlet of the droplet tube.

17. The system of claim 16, wherein at least a portion of the second wall portion of the wall converges toward the draft tube such that the droplet tube has a tapered configuration.

18. The system of claim 14, wherein the baffle is disposed circumferentially about the draft tube and the droplet tube, wherein a passage is disposed between the baffle wall of the baffle and the wall of the droplet tube, and wherein the passage is configured to receive a second cooled syngas generated in the droplet tube from the first syngas.

19. The system of claim 18, wherein the baffle wall comprises one or more openings configured to direct the second cooled syngas to an outlet of the quench system.

20. A method, comprising:
routing a syngas from a gasification chamber, through a dip tube, and into a quench liquid to cool the syngas to generate a cooled syngas;
routing the cooled syngas in a first flow direction through a passage between the dip tube and a draft tube disposed circumferentially about the dip tube; and
directing a flow of the cooled syngas into an annular space circumferentially about the dip tube and the draft tube in a second direction that is different from the first direction using a droplet tube positioned adjacent to a first outlet of the draft tube and a baffle having a baffle wall that axially overlaps with at least portions of the dip tube, the draft tube, and the droplet tube, wherein the droplet tube comprises a first wall having a first wall portion radially extending away from the dip tube and a second wall portion extending axially away from the first wall portion such that a second outlet of the droplet tube is below the first outlet of the draft tube, and wherein the annular space is disposed between the first wall of the droplet tube and a second wall of the draft tube.

* * * * *